(12) United States Patent
Yuan et al.

(10) Patent No.: US 7,103,433 B1
(45) Date of Patent: Sep. 5, 2006

(54) METHOD FOR PROVIDING SERVICE FOR USERS TO DETERMINE ASSEMBLY MATCH INFORMATION OF COMPONENTS

(75) Inventors: Chii-Yah Yuan, Hsin Chu (TW); Hon-Yue Chou, Taipei (TW); Yi-Fei Luo, Hsin Chu Hsien (TW); Teh-Chang Wu, Yungho (TW); Leii H. Chang, Hsin Chu Hsien (TW); Yung-Lung Lin, Tai Ping (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/092,692

(22) Filed: Mar. 30, 2005

(51) Int. Cl.
*G06F 19/00* (2006.01)
(52) U.S. Cl. ........................................ 700/95; 700/225
(58) Field of Classification Search .................. 700/95, 700/115–117, 121, 213–215, 221, 224, 225; 705/22, 23, 26–29
See application file for complete search history.

(56) References Cited

U.S. PATENT DOCUMENTS

| 6,898,489 B1 * | 5/2005 | Hayes, Sr. ............... 701/1 |
|---|---|---|
| 2004/0153378 A1 * | 8/2004 | Perkowski .............. 705/27 |
| 2005/0035860 A1 * | 2/2005 | Taylor et al. ........... 340/572.1 |
| 2005/0049914 A1 * | 3/2005 | Parish ................. 705/14 |
| 2005/0099292 A1 * | 5/2005 | Sajkowsky ............ 340/539.13 |
| 2005/0149414 A1 * | 7/2005 | Schrodt et al. ......... 705/29 |
| 2005/0154572 A1 * | 7/2005 | Sweeney .............. 703/13 |
| 2005/0252971 A1 * | 11/2005 | Howarth et al. ......... 235/451 |
| 2005/0253722 A1 * | 11/2005 | Droms et al. .......... 340/572.1 |

* cited by examiner

*Primary Examiner*—Maria N. Von Buhr
(74) *Attorney, Agent, or Firm*—Rabin & Berdo, P.C.

(57) ABSTRACT

A method for providing service for users to determine assembly match information of components is proposed. The method makes use of computer programs of a communication equipment and cooperation of a database and tag information on the components to provide inquiry judgement and match decision of components for users, thereby accomplishing realtime match inquiry of components and also avoiding erroneous manual assembly. The method not only can provide related specification information of components, but also can provide suggestion for component schemes. If the assembly match information changes, update information of the remote database can be transmitted via the communication equipment to a read/write device to update assembly match information in tags on components.

52 Claims, 6 Drawing Sheets

METHOD FOR PROVIDING SERVICE FOR USERS TO DETERMINE ASSEMBLY MATCH INFORMATION OF COMPONENTS

BACKGROUND OF THE INVENTION

1. Field of the Invention

The present invention relates to a method for providing service for users to determine assembly match information of components and, more particularly, to a method for providing a smart automatic match mechanism via a communication equipment, a read/write device, and a plurality of tags and a matched remote database to provide service for users to determine assembly match information of components and to update quickly assembly match information in the tags.

2. Description of Related Art

Along with the progress of the industrial technology, components of industrial products tend toward complexity and diversification due to continual upgrade of products. The functional wholeness of the final product depends on the exploitability of individual functions of each component and the function interaction between components. In the past, function confirmation of a target component and whether to perform assembly before assembly or for after-sale service usually depend on an assembler's recognition of the component. After a new product is launched, update of the assembly match information of existent components usually cannot keep up, hence resulting in much inconvenience to the assembler and also difficulty of after-sale service.

Because the recognition of component depends on artificial judgement, misjudgment may occur due to insufficient experience or temporary carelessness. Using the car industry as an example, the number of components reaches tens of thousands. Whether the interactions between components are normal relate to the safety of driving. When a car is sent back to the factory for replacement of a component due to breakdown, although the maintenance technician replaces the component according to the specification of the original manufacturer, whether the component is the one defined by the original manufacturer depends on-visual confirmation of the technician. When artificial confirmation is wrong, a wrong component will replace the original component to affect the safety of driving. Therefore, how to use a systematic mechanism to avoid this kind of artificial error is an important issue for providing products of high reliability.

SUMMARY OF THE INVENTION

One object of the present invention is to provide a method for providing service for users to determine assembly match information of components. The method can provide a realtime assembly match information inquiry mechanism, a mechanism capable of avoiding artificial error in assembly, accurate combination of components for assemblers or maintenance technicians, and related specification information of components. Besides, the method can make suggestions to the assembly scheme of replaced components and also provide the function of quickly updating the assembly match information in tags on components.

To achieve the above object, the present invention provides a method for providing service for users to determine assembly match information of components. In this method, a bi-directional communication equipment, a read/write device, and a plurality of tags on components are first provided. The tags are used to store ID codes of the components and product assembly match information. Next, the read/write device is used to read the tag information. The tag information is then transmitted to a computer program of the communication equipment. If the tag information does not include the product assembly match information, a remote database corresponding to the components is connected via the tag ID codes. If the tag information already includes the product assembly match information, it is not necessary to connect to a remote database, and the product assembly match information is directly used. Finally, the computer program provides a component match service based on the tag ID codes or the product assembly match information, and also feeds back related service information to an inquiry terminal.

To achieve the above object, the present invention also provides a method for providing service for users to determine assembly match information of components. In this method, a bi-directional communication equipment, a read/write device, and a plurality of tags on components are first provided. The tags are used to store ID codes of the components and product assembly match information. Next, the read/write device is used to read the tag information. The tag information is then transmitted to a computer program of the communication equipment, and a remote database corresponding to the components is connected via the tag ID codes. The computer program is a component match decision simulation program. Finally, the component match decision simulation program is used to pick 3D figures of the database, display the match simulation situations between at least two components on the communication equipment, and determine whether the match between the at least two components is suitable.

To achieve the above object, the present invention also provides a method for providing service for users to determine assembly match information of components. In this method, a bi-directional communication equipment, a read/write device, and a plurality of tags on components are first provided. The tags are used to store ID codes of the components and product assembly match information. Next, the read/write device is used to read the tag information. The tag information is then transmitted to a computer program of the communication equipment, and a remote database corresponding to the components is connected via the tag ID codes. Finally, the computer program provides a component match service-based on the tag ID codes or the product assembly match information, and also feeds back related service information to an inquiry terminal. The computer program can be an ID code converting program used to convert the tag information into an identical product serial number. The computer program can also be a component match decision program used to determine whether the match between at least two components is suitable. The computer program can also be a component match decision program, which makes use of a database for recording the component match relationship to determine whether the match between at least two component is suitable. The computer program can also be a component match decision simulation program, which picks 3D figures of the database to display the match simulation situations between at least two components on the communication equipment and determine whether the match between the at least two components is suitable. The computer program can also be a component match suggestion program used to provide a different component matchable with a component selected by the user. The computer program can further have a database connection function to operate the database after connection.

To achieve the above object, the present invention also provides a method for providing service for users to determine assembly match information of components. In this method, a bi-directional communication equipment, a read/write device, and a plurality of tags on a component are first provided. The tags are being used to store ID codes of the components and product assembly match information. Next, the read/write device is used to read the tag information. The tag information is then transmitted to a computer program of the communication equipment, and a remote database corresponding to the components is connected via the tag ID codes. Subsequently, update information of the remote database is transmitted to the read/write device via the communication equipment when the assembly match information of the components changes. Finally, the read/write device is used to update the assembly match information in the tags on the components.

To achieve the above object, the present invention also provides a method for providing service for users to determine assembly match information of components. In this method, a bi-directional communication equipment, a read/write device, and a plurality of tags on a component are first provided. The tags are used to store ID codes of the components and product assembly match information. A remote database corresponding to the tag ID codes of the components is also provided. Next, update information of the remote database is transmitted to the read/write device via the communication equipment when the assembly match information of the components changes. Finally, the read/write device is used to update the assembly match information in the tags on the components.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
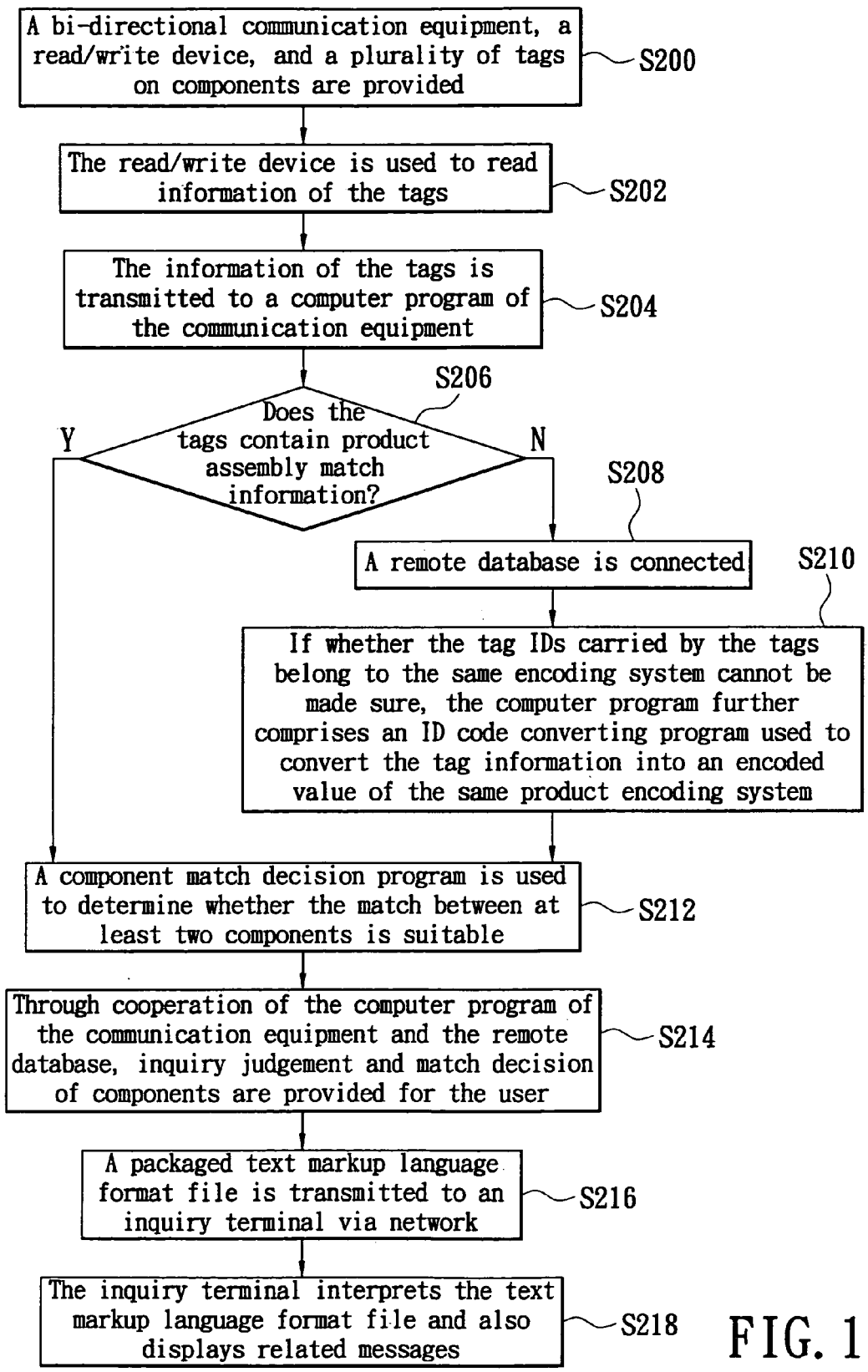
FIG. 1 is a flowchart of a method for providing service for users to determine assembly match information of components according to a first embodiment of the present invention.

FIG. 1 is a flowchart of a method for providing service for users to determine assembly match information of components according to a first embodiment of the present invention. In this method, a bi-directional communication equipment, a read/write device, and a plurality of tags on components are first provided (Step S200) The tags are used to store ID codes of the components and product assembly match information. The bi-directional communication equipment is a terminal, a computer, a PDA, or a mobile phone. The bi-directional communication equipment can be wired or wireless. The wired bi-directional communication equipment carries out transmission by using a network line. The wireless bi-directional communication equipment carries out transmission by means of bluetooth communication, IR communication, electric wave communication, or RF communication. The tags can be RFIDs, bar codes, chips, or character-numeral symbols.

Next, the read/write device is used to read the tag information (Step S202) The tag information includes component ID code, 3D figure serial number, 3D-model, industry type, manufacturer, weight, capacity, general description, point for attention, outward appearance diagram, and product assembly match information. The tag information can further be transmitted to an open or private web service via network to provide a component match scheme inquiry service. The tag information is then transmitted to a computer program of the communication equipment (Step S204) Subsequently, whether the tags include the product assembly match information is determined (Step S206) If the answer is no, a remote database corresponding to the components is connected via the tag ID codes (Step S208) If whether the tag IDs carried by the tags belong to the same encoding system cannot be made sure, the computer program further comprises an ID code converting program used to convert the tag information into an encoded value of the same product encoding system (Step S210).

Next, a component match decision program is used to determine whether the match between at least two components is suitable (Step S212), or the component match decision program makes suggestion to the content of components. Through cooperation of the computer program of the communication equipment and the remote database, inquiry judgement and match decision of components are then provided for the user (Step S214).

Moreover, a packaged text markup language format file is transmitted to an inquiry terminal via network (Step S216) Finally, the inquiry terminal interprets the text markup language format file and also displays related messages (Step S218) The related messages relate to other match combinations of component if the match between the components is determined to be unsuitable.

Figure 2:
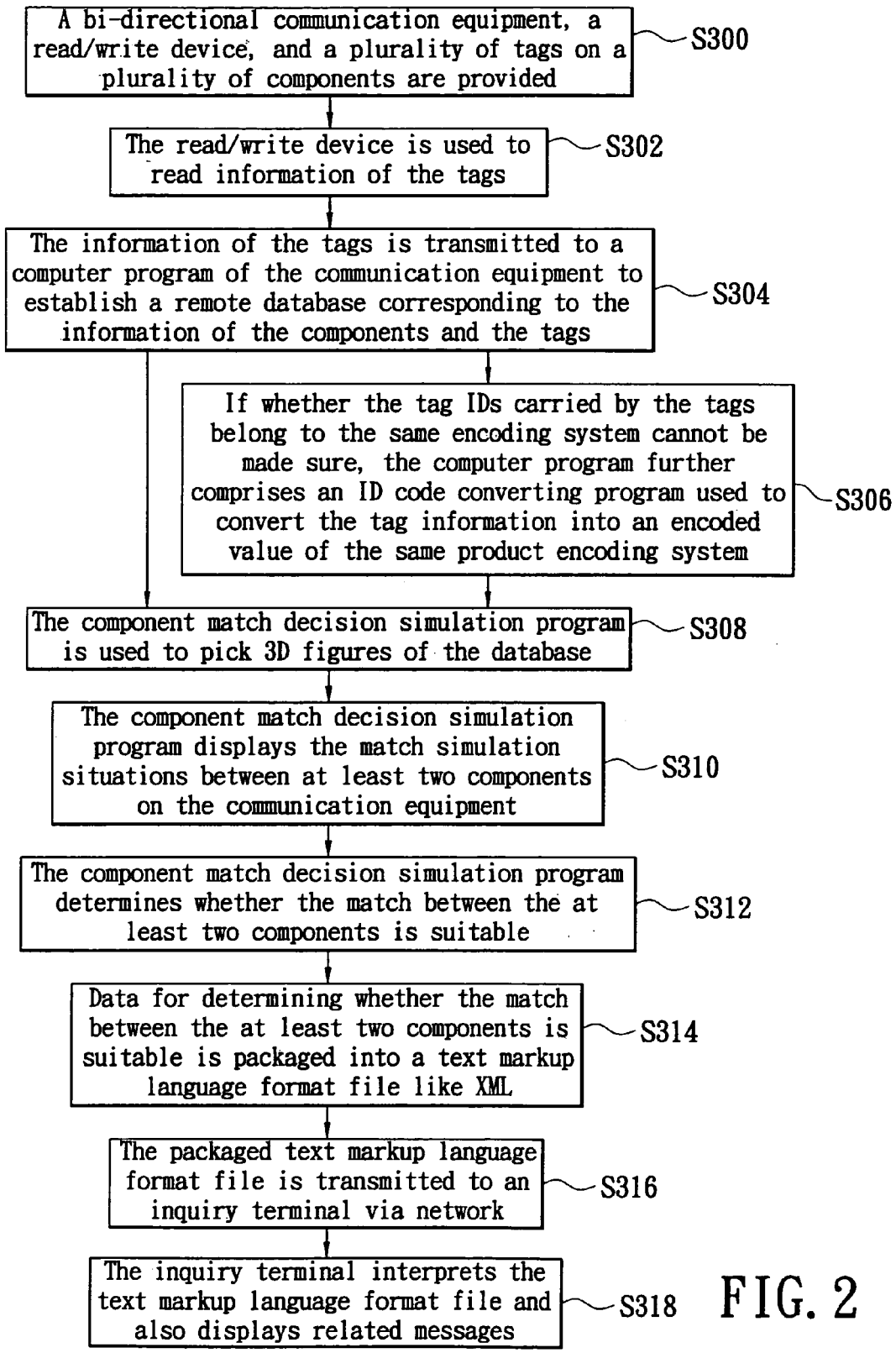
FIG. 2 is a flowchart of a method for providing service for users to determine assembly match information of components according to a second embodiment of the present invention.

FIG. 2 is a flowchart of a method for providing service for users to determine assembly match information of components according to a second embodiment of the present invention. In this method, a bi-directional communication equipment, a read/write device, and a plurality of tags on components are first provided (Step S300) The tags are used to store ID codes of the components and product assembly match information. The bi-direction communication equipment and the tags are the same as those in the first embodiment. Next, the read/write device is used to read the tag information (Step S302) The tag information is the same as that in the first embodiment. The tag information is then transmitted to a computer program of the communication equipment to establish a remote database corresponding to the information of the components and the tags (Step S304) The computer program is a component match decision simulation program.

If whether the tag IDs carried by the tags belong to the same encoding system cannot be confirmed, the computer program further comprises an ID code converting program used to convert the tag information into an encoded value of the same product encoding system (Step S306).

Next, the component match decision simulation program is used to pick 3D figures of the database (Step S308) The component match decision simulation program then displays the match simulation situations between at least two components on the communication equipment (Step S310) Finally, the component match decision simulation program determines whether the match between the at least two components is suitable (Step S312).

Moreover, this method further comprises the following steps after Step S312 of determining whether the match between the components is suitable. Data for determining whether the match of at least two components is suitable is first packaged into a text markup language format file like XML (Step S314) The packaged text markup language format file is then transmitted to an inquiry terminal via network (Step S316) Finally, the inquiry terminal interprets the text markup language format file and displays related messages (Step S318) The related messages relate to other match combinations of component if the match between the components is determined to be unsuitable.

Figure 3:
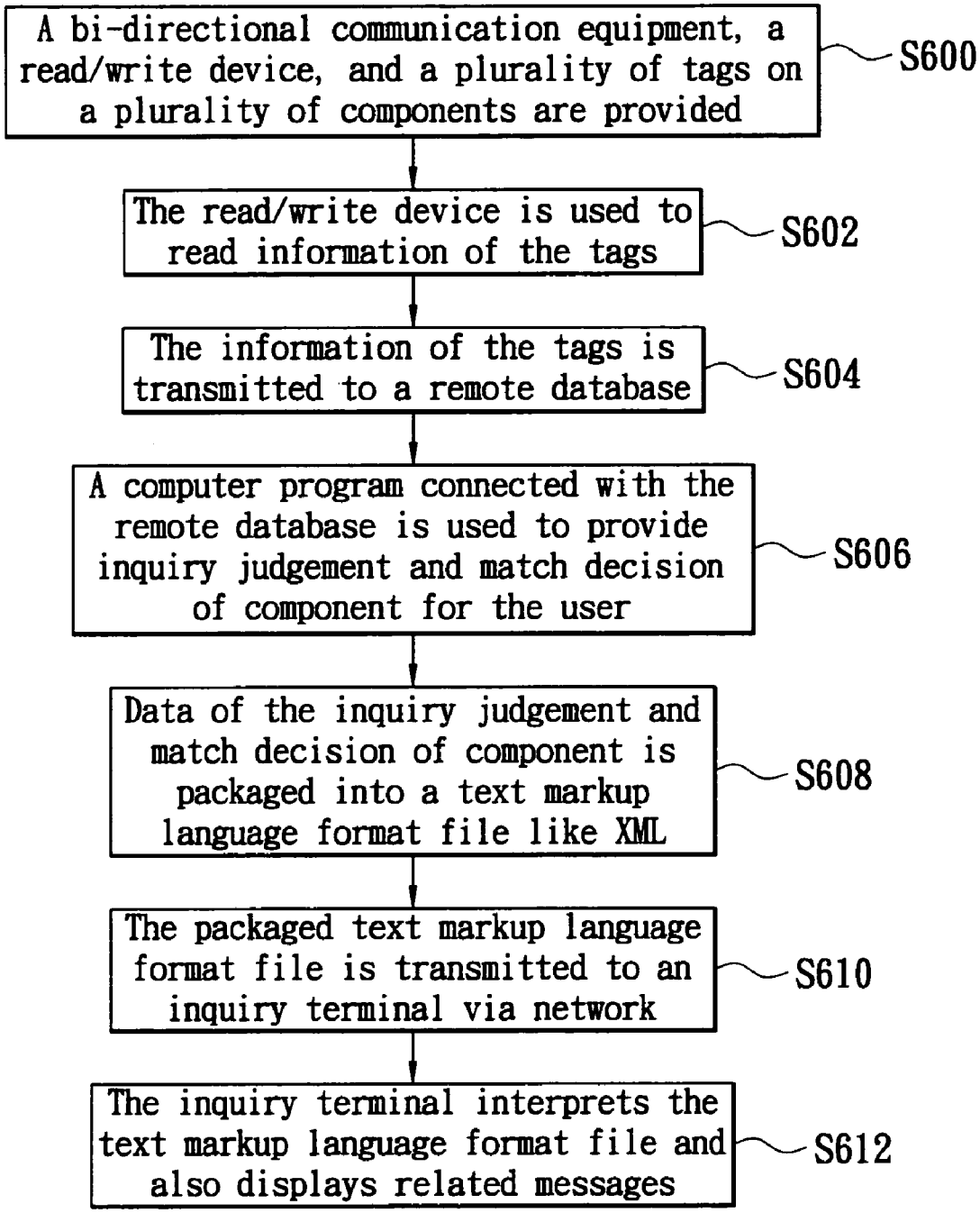
FIG. 3 is a flowchart of a method for providing service for users to determine assembly match information of components according to a third embodiment of the present invention.

FIG. 3 is a flowchart of a method for providing service for users to determine assembly match information of components according to a third embodiment of the present invention. In this method, a bi-directional communication equipment, a read/write device, and a plurality of tags on components are first provided (Step S600) The tags are used to store ID codes of the components and product assembly match information. The bi-direction communication equipment and the tags are the same as those in the first embodiment. Next, the read/write device is used to read the tag information (Step S602) The tag information is the same as that in the first embodiment. The tag information is then transmitted to a remote database (Step S604) The computer program is not limited to the programs stated in the first embodiment. More than one program can be matched for different use purposes. Finally, a computer program connected with the remote database is used to provide inquiry judgement and match decision of component for the user (Step S606).

Moreover, this method further comprises the following steps after Step S606 of providing inquiry judgement and match decision of component for the user. Data of the inquiry judgement and match decision of component is first packaged into a text markup language format file like XML (Step S608) The packaged text markup language format file is then transmitted to an inquiry terminal via network (Step S610) Finally, the inquiry terminal interprets the text markup language format file and displays related messages (Step S612) The related messages relate to other match combinations of component if the match between the components is determined to be unsuitable.

Figure 4:
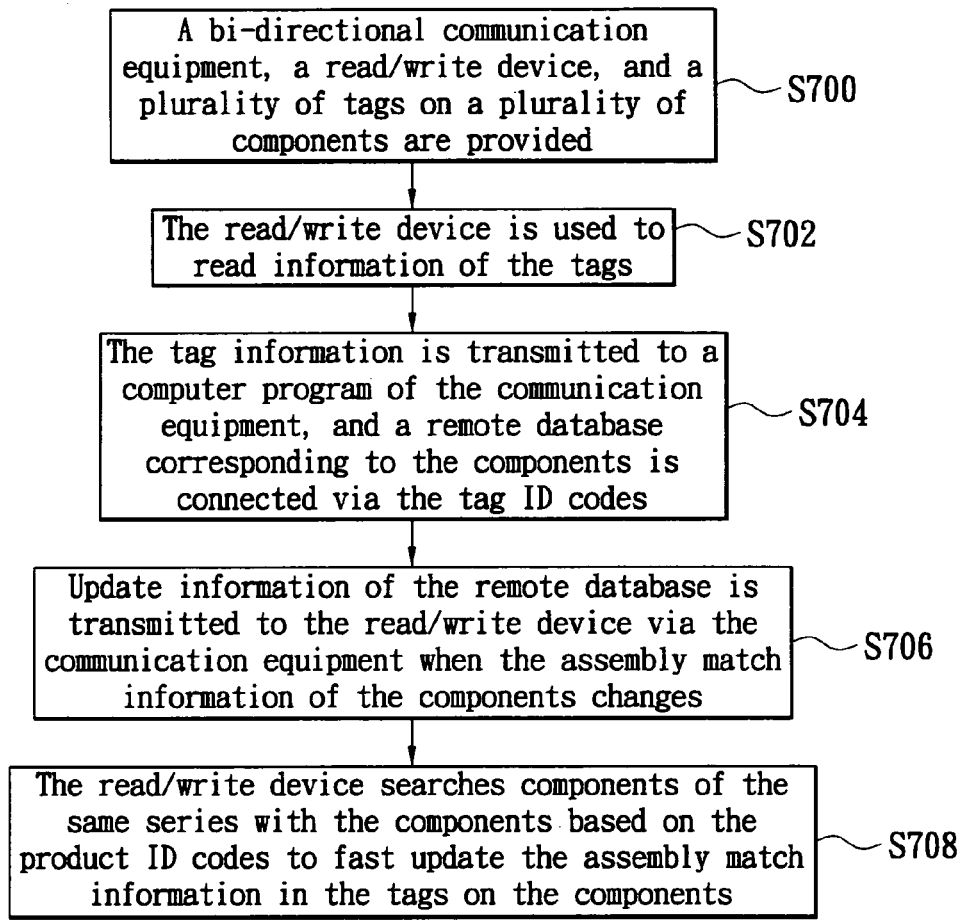
FIG. 4 is a flowchart of a method for providing service for users to determine assembly match information of components according to a fourth embodiment of the present invention.

FIG. 4 is a flowchart of a method for providing service for users to determine assembly match information of components according to a fourth embodiment of the present invention. In this method, a bi-directional communication equipment, a read/write device, and a plurality of tags on components are first provided (Step S700) The tags are used to store ID codes of the components and product assembly match information. Next, the read/write device is used to read the tag information (Step S702) The tag information is then transmitted to a computer program of the communication equipment, and a remote database corresponding to the components is connected via the tag ID codes (Step S704) Subsequently, update information of the remote database is transmitted to the read/write device via the communication equipment when the assembly match information of the components changes (Step S706) Finally, the read/write device searches components of the same series with the components based on the product ID codes to fast update the assembly match information in the tags on the components (Step S708).

Figure 5:
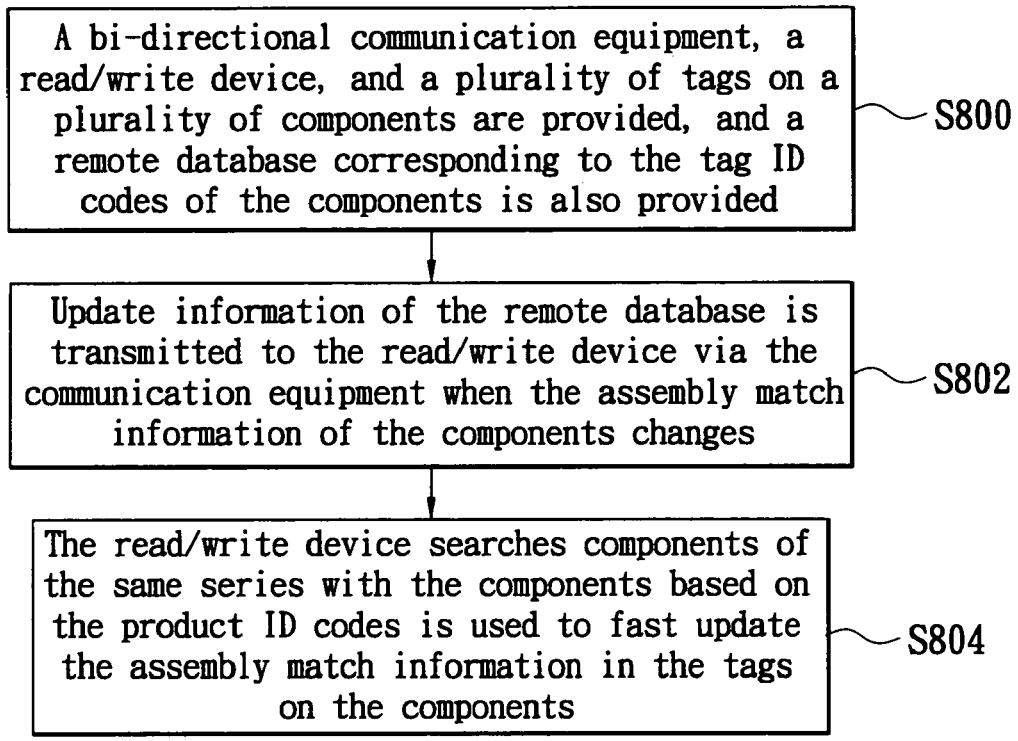
FIG. 5 is a flowchart of a method for providing service for users to determine assembly match information of components according to a fifth embodiment of the present invention.

FIG. 5 is a flowchart of a method for providing service for users to determine assembly match information of components according to a fifth embodiment of the present invention. In this method, a bi-directional communication equipment, a read/write device, and a plurality of tags on components for storing ID codes of the components and product assembly match information are provided, and a remote database corresponding to the tag ID codes of the components is also provided (Step S800) Update information of the remote database is then transmitted to the read/write device via the communication equipment when the assembly match information of the components changes (Step S802) Finally, the read/write device searches components of the same series with the components based on the product ID codes is used to fast update the assembly match information in the tags on the components (Step S804).

Figure 6:
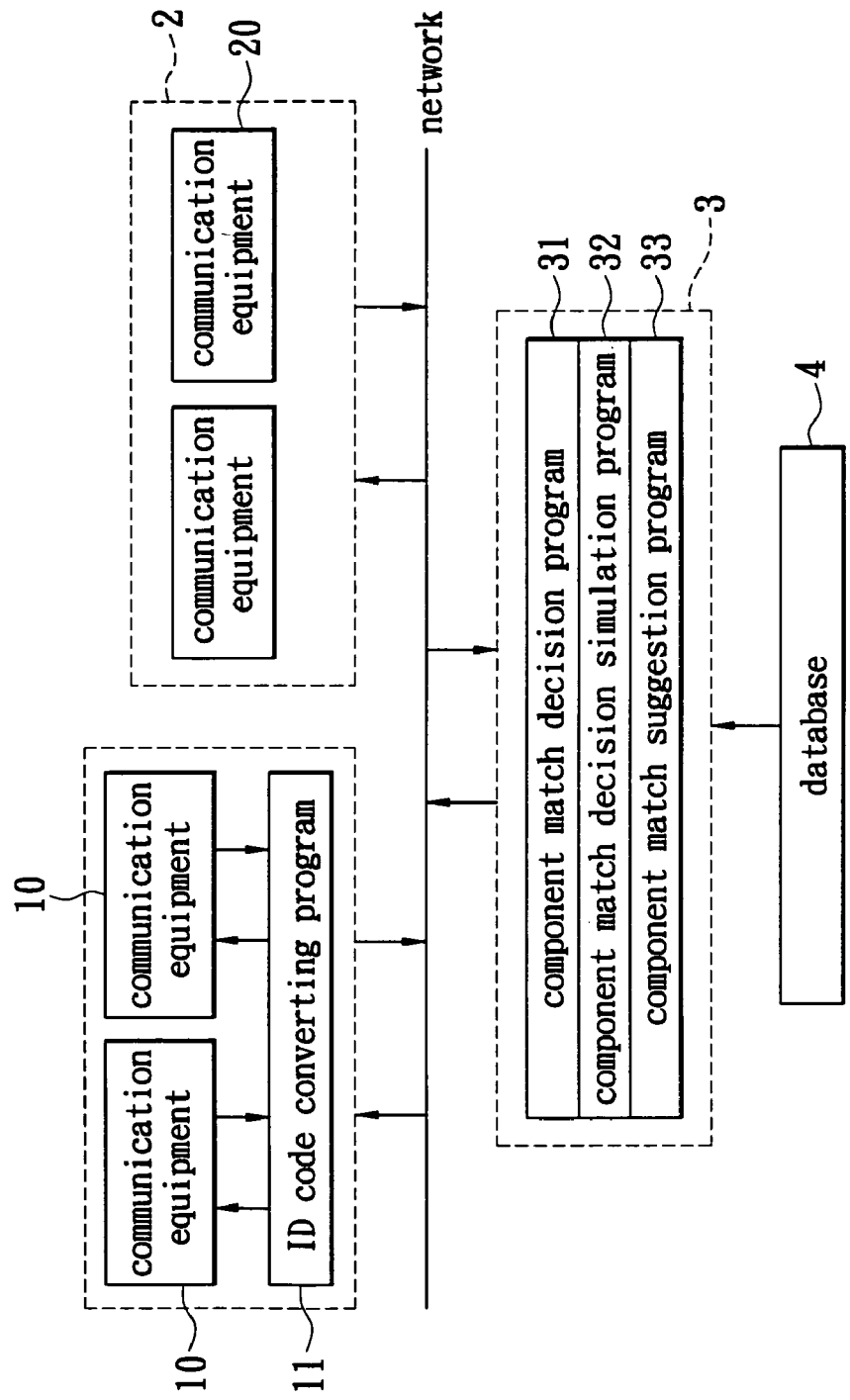
FIG. 6 is a system architecture diagram of the present invention.

FIG. 6 is a system architecture diagram of the present invention. The system comprises a user 1, another user 2, a computer program 3, and a database 4.

The user 1 has a communication equipment 10 and an ID code converting program 11. The user 2 has a communication equipment 20. The computer program 3 has a component match decision program 31, a component match decision simulation program 32, and a component match suggestion program 33. Inquiry judgement and match decision can be provided for the user 1 through the communication equipment 10 and the ID code converting program 11 and the computer program 3 connected with the database 4 via network. The user 2 can directly use the communication equipment 2 to accomplish the same effect via network through the computer program 3.

The present invention is illustrated in more detail below.

1. Establishing Primary Data of Component:

Data of related information and specifications of component are recorded. The essential information is the product component code. The product component code is encoded by the manufacturer, or is any code of the component that can be uniquely identified. In addition to the product component serial number, descriptive data for the component such as component figure data, component function description, component industry can be established to feed back more detailed to the inquiry terminal. Storage of the primary data of component can be accomplished by using an existent database technique. Any feasible program language can be used to realize the required user interface program. Table 1 shows an example of the primary data of component:

TABLE 1

| Product Component Code | Component Description | Industry Type | Manufacturer | Weight (g) | Volume (L) | Length (cm) | Width (cm) | Height (cm) |
|---|---|---|---|---|---|---|---|---|
| 2004100102987531221 | Bearing | Mobile | Ford | 1324 | 3.12 | 10 | 20 | 30 |
| 2004100103029783213 | Cylinder | Mobile | Honda | 36510 | 9.07 | 15 | 9 | 7 |

2. Establishing Match Matrix of Components:

A match matrix is an N×N matrix, wherein N is the number of ISCN and is also the number of component registered in the primary data of component. The match matrix records the feasibility of match between components. Storage of the match matrix can be accomplished by using an existent database technique. Any feasible program language can be used to realize the required user interface program. Table 2 shows an example of the match matrix wherein the symbol "v" means match can be accomplished between the two components:

TABLE 2

| Product Component Serial Number | 2004100102987531221 | 2004100103029783213 | 2004100398765413213 |
|---|---|---|---|
| 2004100102987531221 | | | v |
| 2004100103029783213 | | | v |
| 2004100398765413213 | v | v | |

3. Establishing Correspondence Between Tag IDs and Product Component Codes:

In practical applications, one can ensure the tag ID carried by a tag is necessarily equivalent to the product component serial number. Therefore, it is necessary to establish correspondence between tag IDs and product component serial numbers to make sure that the tag obtained by a reader can be converted into a correct product component serial number. Correspondence data of tag IDs and product component serial numbers can be accomplished by using an existent database technique. Any feasible program language can be used to realize the required user interface program. Table 3 shows an example of correspondence between tag IDs and product component codes:

TABLE 3

| Tag ID | Product Component Code |
|---|---|
| TG_200401 | 2004100102987531221 |
| TG_200402 | 2004100103029783213 |
| TG_200403 | 2004100398765413213 |

4. Establishing a Knowledge Service Terminal for Match Decision:

A public (or private) knowledge service terminal is established. This terminal accepts a product component code, or an international or industry standard code (assembly scheme) from the inquiry terminal, makes a feasibility decision of match for this assembly scheme, and sends the decision result back to the inquiry terminal. The assembly scheme is decided based on the calculation of the match matrix. If the decision result of match is successful, in addition to sending back the decision result, this terminal can also provide related component information like component design diagram, outward appearance of component, and product assembly match information to the inquiry terminal according to the primary data of component. If the decision result of match is unsuccessful, the decision result and suggested assembly schemes of match are sent back. Establishment of the knowledge service terminal can make use of the Internet to accomplish public (or private) function, but is not limited to the Internet. Any feasible program language like Web Service of Microsoft.Net can be used to realize the required user interface program.

5. Establishing a Conversion Terminal of Tag IDs and Product Component Codes:

A private (or public) conversion terminal is established. This terminal accepts a tag ID transmitted from the inquiry terminal, and converts this tag ID into a product component code. When the tag contains a product component code, this conversion terminal can be saved. For instance, in addition to the tag ID, an RFID TAG of sufficient capacity can also store a product component code or an international or industry standard code. When the tag cannot store the information of a product component code, or an international or industry standard code, it is necessary to establish this conversion terminal. For instance, a common bar code cannot additionally store a product component code of a component. The establishment of a conversion terminal of tag IDs and product component codes has also the advantage of keeping flexibility. In practical applications, an enterprise can generate tag IDs based on its own logic because the conversion terminal of tag IDs and product component codes can correctly convert tag IDs in the enterprise into product component codes. Any feasible program language can be used to realize the required user interface program.

6. Establishing Inquiries of the Inquiry Terminal:
(1) A tag ID is generated based on correspondence between tag IDs and product component codes. That is, a tag attached to a component needs to reflect the definition of the component in product component codes.
(2) A tag is attached to each component.
(3) A reader (e.g., an RFID reader or a PDA with a reader) and a display device (e.g., a PDA or a PC) of the inquiry terminal are installed.

To sum up, the present invention has the following advantages:
1. Accurate assembly decision can be provided through systematic operations to avoid artificial errors.
2. If only the product component code of a single component is transmitted when making the inquiry, suggested assembly schemes are sent back to save the time of finding matched components in various manuals for the assembler.
3. Smart data readers are supported to fasten the operation of confirming component information. With the maintenance of car as an example, when a car is sent back to the factory for maintenance, it is only necessary to install a smart reader at the maintenance entrance to know whether the car contains a problematic component, hence saving the check time for the technician.
4. A recording function of component assembly is provided to facilitate data analysis afterwards.
5. The establishment of correspondence mechanism of tag IDs and product component codes allows the industry not to replace new tag and reader hardware in practical applications, hence greatly lowering the application cost.
6. A public web service is provided to accomplish the effect of information sharing.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A method for providing users information for matching components for assembly, the method comprising the steps of:
providing bi-directional communication equipment, a read/write device, and a plurality of tags on the components, said tags being used to store tag information including ID codes of said components and product assembly match information;
using said read/write device to read said tag information;
transmitting said tag information to an ID code converting program of said communication equipment for converting said tag information into an encoded value of an encoding system if the tag information is unidentified;
transmitting said tag information to a computer program of said communication equipment;
wherein said computer program is a component match decision program used to determine whether a plurality of components should be matched for assembly; and
said computer program feeding back data regarding matching of the components to an inquiry terminal based on the received tag information.

2. The method as claimed in claim 1, wherein said bi-directional communication equipment is wired or wireless.

3. The method as claimed in claim 1, wherein said bi-directional communication equipment carries out transmission using a network line.

4. The method as claimed in claim 1, wherein said bi-directional communication equipment carries out transmission by means of bluetooth communication, IR communication, electric wave communication, or RF communication.

5. The method as claimed in claim 1, wherein said bi-directional communication equipment is a terminal, a computer, a PDA, or a mobile phone.

6. The method as claimed in claim 1, wherein said tags are RFIDs, bar codes, chips, or character-numeral symbols.

7. The method as claimed in claim 1, wherein said tag information includes a component ID code, 3D figure serial number, 3D-model, industry type, manufacturer, weight, capacity, general description, point for attention, outward appearance diagram, and product assembly match information.

8. The method as claimed in claim 1, wherein said component match decision program makes use of a data table for recording the component match relationship to determine whether the components should be matched for assembly.

9. The method as claimed in claim 1, wherein said component match decision program compares assembly match information of a plurality of tags to determine whether the components should be matched for assembly.

10. The method as claimed in claim 1, wherein said component match decision program is a component match decision simulation program, and said component match decision simulation program picks 3D figures of a database storing 3D figures to display match simulation situations between at least two components on said communication equipment and also determines whether the components should be matched for assembly.

11. The method of providing as claimed in claim 1, wherein said component match decision program is a component match suggestion program, and responsive to a selection by a user of one component, said program provides a different component matchable for assembly with said one component.

12. The method as claimed in claim 1, wherein said computer program further includes a database connection function to operate a database after connection.

13. The method as claimed in claim 1, wherein said tag information is further transmitted to a web service via a network to provide a component match service.

14. A method for providing users information for matching components for assembly, the method comprising the steps of:
providing bi-directional communication equipment, a read/write device, and a plurality of tags on the components, said tags being used to store tag information including ID codes of said components and product assembly match information;
using said read/write device to read said tag information;
transmitting said tag information to a computer program of said communication equipment to establish a remote database containing 3D figures corresponding to said components via the ID codes of said tags, said computer program being a component match decision simulation program;
using said component match decision simulation program to pick 3D figures of said database;
using said component match decision simulation program to display match simulation situations between at least two components on said communication equipment; and
said component match decision simulation program to determine whether the components should be matched for assembly.

15. The method as claimed in claim 14, wherein said bi-directional communication equipment is wired or wireless.

16. The method as claimed in claim 14, wherein said bi-directional communication equipment is a terminal, a computer, a PDA, or a mobile phone.

17. The method as claimed in claim 14, wherein said tags are RFIDs, bar codes, chips, or character-numeral symbols.

18. The method as claimed in claim 14, wherein said tag information includes component ID code, 3D figure serial number, 3D-model, industry type, manufacturer, weight, capacity, general description, point for attention, outward appearance diagram, and product assembly match information.

19. The method as claimed in claim 14, wherein said computer program is an ID code converting program for converting said tag information into an encoded value of an encoding system if the tag information is unidentified.

20. The method as claimed in claim 14, wherein said tag information is further transmitted to a web service via a network to provide a component match scheme inquiry service.

21. A method for providing users information for matching components for assembly, the method comprising the steps of:
providing bi-directional communication equipment, a read/write device, and a plurality of tags on the components, said tags being used to store tag information including ID codes of said components and product assembly match information;
using said read/write device to read said tag information;
transmitting said tag information to a database; and
using a computer program connected with said database for converting said ID codes, and make a match decision of components for users to assemble said components.

22. The method as claimed in claim 21, wherein said bi-directional communication equipment is wired or wireless.

23. The method as claimed in claim 21, wherein said bi-directional communication equipment carries out transmission by using a network line.

24. The method as claimed in claim 21, wherein said bi-directional communication equipment carries out transmission by means of bluetooth communication, IR communication, electric wave communication, or RF communication.

25. The method as claimed in claim 21, wherein said bi-directional communication equipment is a terminal, a computer, a PDA, or a mobile phone.

26. The method as claimed in claim 21, wherein said tags are RFIDs, bar codes, chips, or character-numeral symbols.

27. The method as claimed in claim 21, wherein said tag information includes component ID code, 3D figure serial number, 3D-model, industry type, manufacturer, weight, capacity, general description, point for attention, outward appearance diagram, and product assembly match information.

28. The method as claimed in claim 21, wherein said computer program is an ID code converting program for converting said tag information into an encoded value of an encoding system if the tag information is unidentified.

29. The method as claimed in claim 21, wherein said computer program is a component match decision program used to determine whether the components should be matched for assembly.

30. The method as claimed in claim 21, wherein said computer program is a component match decision program, and said component match decision program makes use of a data table for recording a component match relationship to determine whether the components should be matched for assembly.

31. The method as claimed in claim 21, wherein said computer program is a component match decision simulation program, and said component match decision simulation program picks 3D figures of said database to display match simulation situations between at least two components on said communication equipment and also determines whether the components should be matched for assembly.

32. The method as claimed in claim 21, wherein said computer program is a component match suggestion program, and when the user selects one component, said program provides a different component matchable with said component.

33. The method as claimed in claim 21, wherein said computer program further comprises a database connection function to operate said database after connection.

34. The method as claimed in claim 21, wherein said tag information is further transmitted to a web service via network to provide a component match scheme inquiry service.

35. The method as claimed in claim 21, further comprising the following steps after said step of using a computer program connected with said database to provide said match decision of components for users:
packaging the match decision data of said component into an expandable text markup language format file like XML;
transmitting said packaged text markup language format file to an inquiry terminal via network; and
using said inquiry terminal to interpret said text markup language format file and also display messages, the messages having a content related to said component match decision program compares assembly match information of a plurality of tags to determine whether the components should be matched for assembly.

36. A method for providing for users information for matching components for assembly, the method comprising the steps of:
providing bi-directional communication equipment, a read/write device, and a plurality of tags on the components, said tags being used to store tag information including ID codes of said components and product assembly match information;
using said read/write device to read said tag information;
transmitting said tag information to a computer program of said communication equipment and converting said tag information by said computer program into an identical product encoded value if the tag information is unidentified, and connecting via the tag ID codes to a remote database storing information corresponding to said components and the tag ID codes thereof;
transmitting update information of said remote database to said read/write device via said communication equipment in response to a change in the assembly match information of said components; and
using said read/write device to update the assembly match information in said tags on said components.

37. The method as claimed in claim 36, wherein said bi-directional communication equipment is wired or wireless.

38. The method as claimed in claim 36, wherein said bi-directional communication equipment carries out transmission by using a network line.

39. The method as claimed in claim 36, wherein said bi-directional communication equipment carries out transmission by means of bluetooth communication, IR communication, electric wave communication, or RF communication.

40. The method as claimed in claim 36, wherein said bi-directional communication equipment is a terminal, a computer, a PDA, or a mobile phone.

41. The method as claimed in claim 36, wherein said tags are RFIDs, bar codes, chips, or character-numeral symbols.

42. The method as claimed in claim 36, wherein said tag information includes component ID code, 3D figure serial number, 3D-model, industry type, manufacturer, weight, capacity, general description, point for attention, outward appearance diagram, and product assembly match information.

43. The method as claimed in claim 36, wherein said computer program is an ID code converting program for converting said tag information into an encoded value of an encoding system if the tag information is unidentified.

44. The method as claimed in claim 36, wherein said computer program further comprises a database connection function to operate said database after connection.

45. The method as claimed in claim 36, wherein said tag information is further transmitted to a web service via network to provide a component match service.

46. A method for providing users information for matching components for assembly, the method comprising the steps of:
providing bi-directional communication equipment, a read/write device, and a plurality of tags on a component, said tags being used to store ID codes of said components and product assembly match information, and providing a remote database with the product assembly match information and said tag ID codes of said components;
responsive to a change in the assembly match information of said components, transmitting update information of said remote database to said read/write device via said communication equipment; and
using said read/write device to update the assembly match information in said tags on said components.

47. The method as claimed in claim 46, wherein said bi-directional communication equipment is wired or wireless.

48. The method as claimed in claim 46, wherein said bi-directional communication equipment carries out transmission by using a network line.

49. The method as claimed in claim 46, wherein said bi-directional communication equipment carries out transmission by means of bluetooth communication, IR communication, electric wave communication, or RF communication.

50. The method as claimed in claim 46, wherein said bi-directional communication equipment is a terminal, a computer, a PDA, or a mobile phone.

51. The method as claimed in claim 46, wherein said tags are RFIDs, bar codes, chips, or character-numeral symbols.

52. The method as claimed in claim 46, wherein said tag information includes component ID code, 3D figure serial number, 3D-model, industry type, manufacturer, weight, capacity, general description, point for attention, outward appearance diagram, and product assembly match information.

* * * * *